Oct. 20, 1959     O. VON ZELEWSKY     2,909,010
PROCESS OF AND APPARATUS FOR FORMING MANIFOLD SYMMETRICAL
NON-CIRCULAR PROFILES ON WORKPIECES
Filed March 20, 1956     5 Sheets-Sheet 3

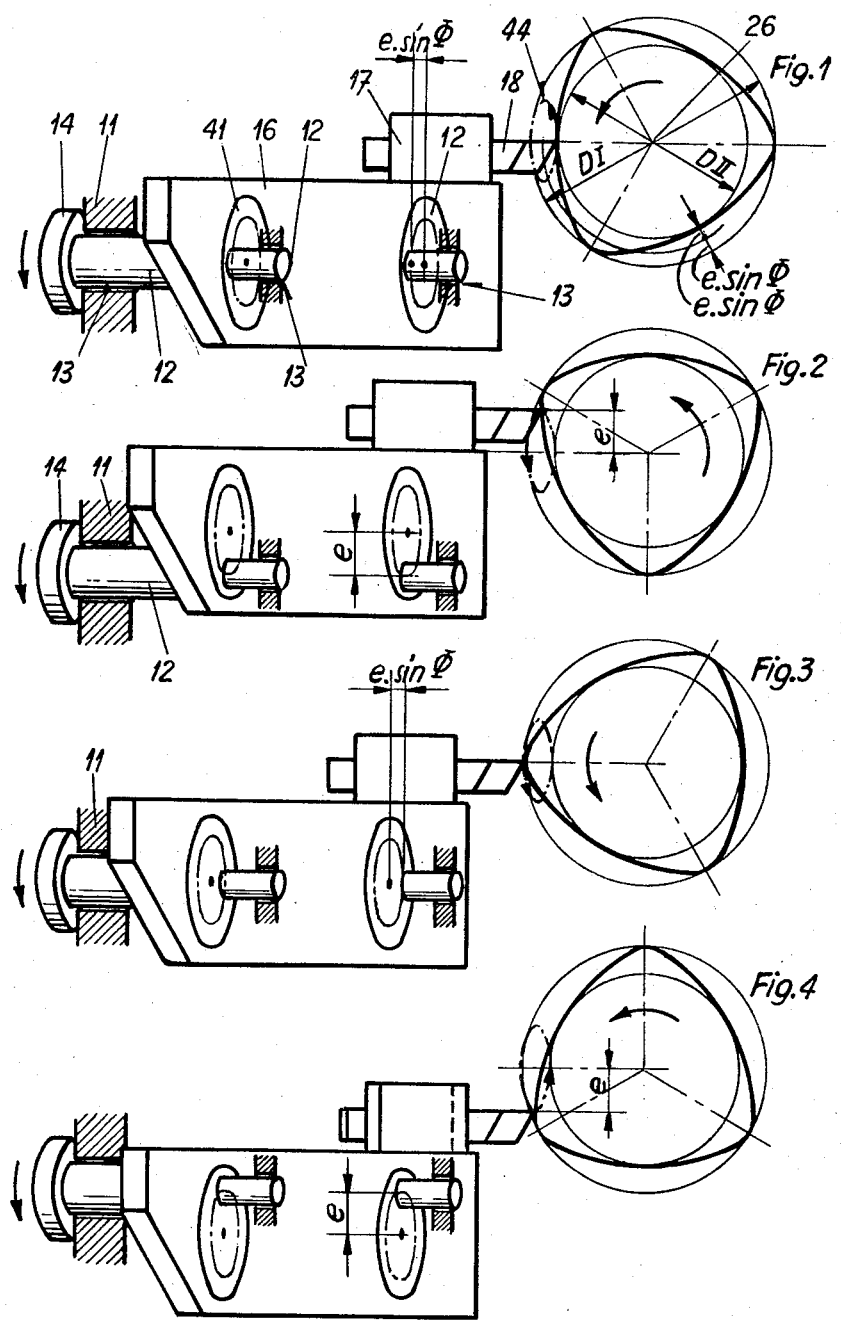

INVENTOR.
OTTOMAR VON ZELEWSKY
BY

UNITED STATES PATENT OFFICE 2,909,010
Patented Oct. 20, 1959

2,909,010

PROCESS OF AND APPARATUS FOR FORMING MANIFOLD SYMMETRICAL NON-CIRCULAR PROFILES ON WORKPIECES

Ottomar von Zelewsky, Neuhausen am Rheinfall, Switzerland, assignor to Georg Fischer Aktiengesellschaft, Schaffhausen, Switzerland, a Swiss company Application March 20, 1956, Serial No. 572,701

Claims priority, application Switzerland March 24, 1955

11 Claims. (Cl. 51—90)

This invention relates to processes of and apparatus for forming or shaping of manifold symmetrical, non-circular profiles on workpieces, especially through machining of the same.

It is an important object of the present invention to provide means facilitating formation of non-circular profiles on both outer and inner surfaces of workpieces in a rapid and forthright manner while nevertheless ensuring a high degree of accuracy in the profile-forming operation.

Another object of the present invention is the provision of means conducive to imparting manifold symmetrical, non-circular profiles or contours to workpieces having cylindrical, conical or similar geometric shapes, in particular with a machine tool on which the workpiece is rotated at a uniform rotational speed while a cutting, turning, milling or grinding tool executes a bodily movement along a circular path the speed of which may be regulated in accordance with the rotational speed of the workpiece, said speed corresponding to the profiles to be formed.

It is also an object of the present invention to provide means contributing to machine tool-like apparatus of the aforesaid type which is not only much less complex and difficult to construct than heretofore known apparatus designed for a similar purpose but which is also more simple and inexpensive to operate than such known apparatus.

More particularly, a number of procedures or methods and apparatus are already known for working and forming manifold symmetrical, non-circular profiles on workpieces with the aid of kinematic transmissions or linkages. In carrying out these procedures, the workpiece-shaping operation is effected by means of grinding wheels or milling cutters so arranged that the oscillatory movement of the tool support, i.e., of the bearing means for the spindle of the wheel or cutter, is imparted to the same from a driven eccentric shaft through a vertical and a horizontal ram system.

The tool, or rather its bearing means, is, moreover, arranged in a parallel guide structure. By means of adjustable elements, the transmission ratio of the horizontal ram system may be changed to selectively permit shaping of single apex non-circular profiles (circular eccentrics), double apex non-circular profiles (ellipses), triple apex non-circular profiles (equilateral triangles), and the like.

In all of these cases, the ultimate path of movement of the tool as determined by the combined actions of the two ram systems is an ellipse the plane of which is perpendicular to the axis of rotation of the workpiece. The multiplicity of motion transmission systems necessitates the use of relatively complex guide and reversing mechanisms which are highly subject to wear and tear.

It is, therefore, still another object of the present invention to provide means avoiding the disadvantages and drawbacks of heretofore known processes and particularly through the implementation of a process which is characterized by the fact that the tool (or its bearing means) moves in a circular path while the plane of this path, in contradistinction to said known processes, is oriented obliquely with respect to the axis of rotation of the workpiece.

Yet a further object of the present invention is to provide means affording highly efficacious, thoroughly reliable apparatus for implementing the aforesaid process in a manner not subject to the above-mentioned disadvantages, said apparatus being characterized by the fact that at least one eccentric or crank supported on a slide or carriage displaceable in a plane parallel to the axis of rotation of the workpiece imparts a circular motion to the tool, the axis of the eccentric being arranged at a predetermined angle (less than 90°) to the axis of the workpiece.

These and other objects and advantages of the invention will become further apparent from the following detailed description, reference being made to the accompanying drawings showing preferred embodiments of the invention.

In the drawings:

Figs. 1 to 4 illustrate in diagrammatic form the principles and tool movements involved in shaping an equilateral triangular or three-edged external profile on a body or workpiece in accordance with the present invention;

Figure 5:
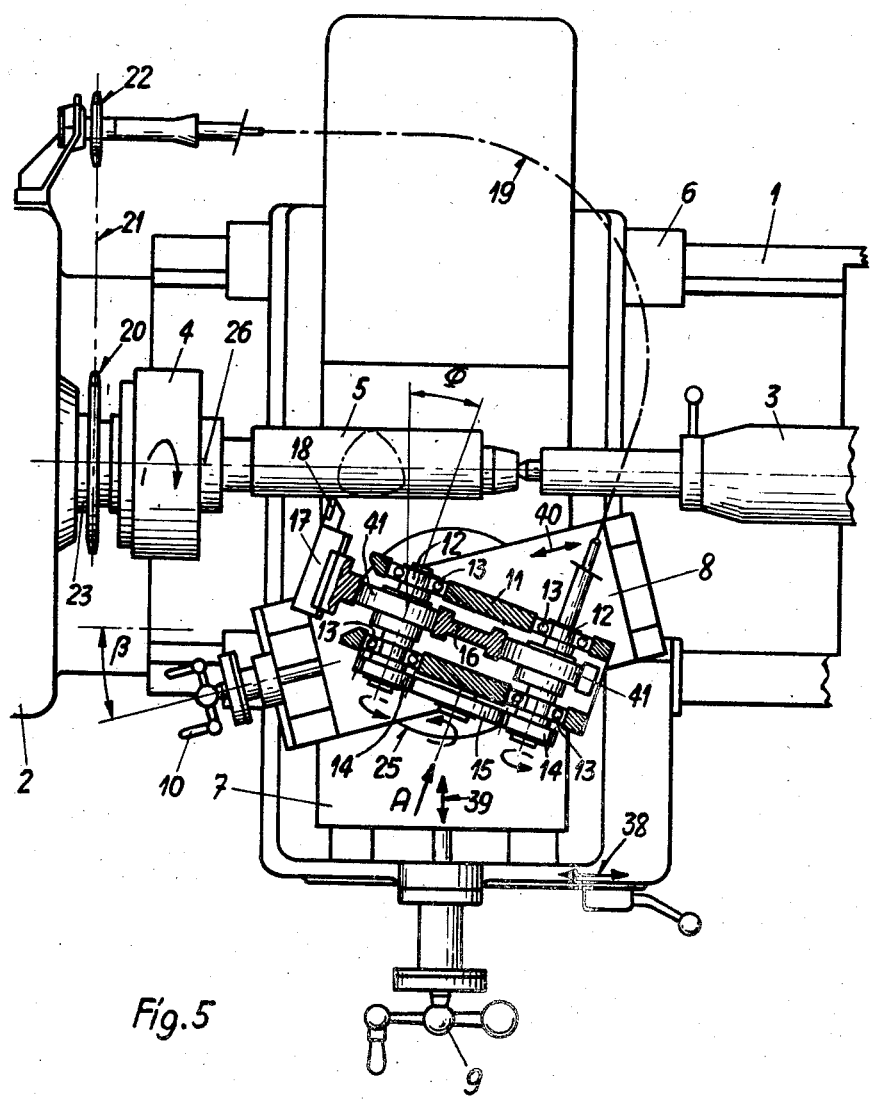
Fig. 5 is a partly sectional top plan view of one embodiment of a machine tool or like apparatus constructed in accordance with the present invention, the view being taken substantially along the line V—V in Fig. 6.
Figure 6:
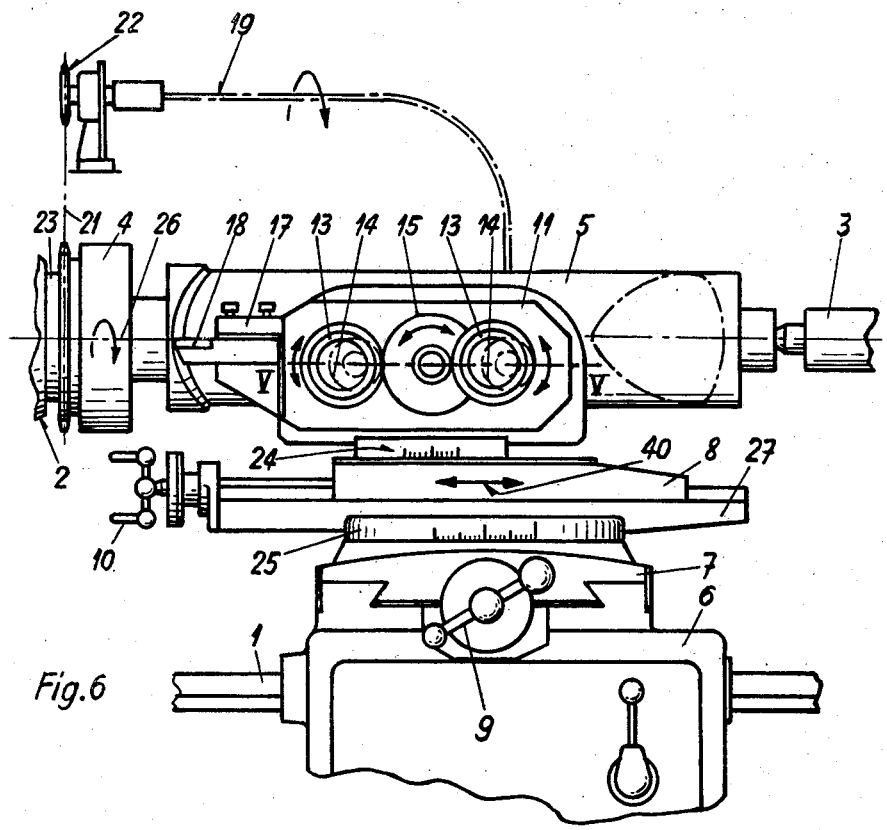
Fig. 6 is a front view of the apparatus illustrated in Fig. 5.
Figure 7:
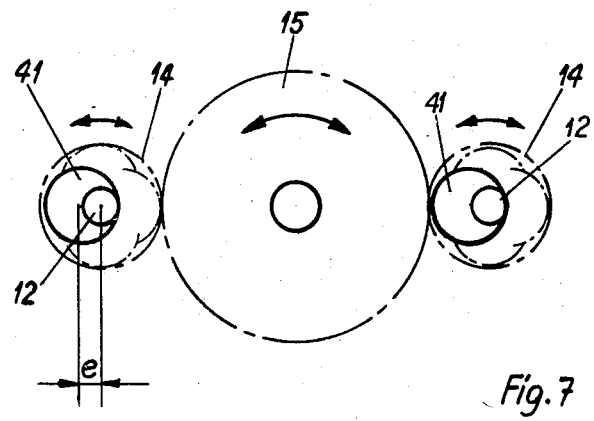
Fig. 7 is a schematic illustration of the eccentric or crankshaft drive employed in the apparatus of Figs. 5 and 6.

Referring first to Figs. 5 to 7, it will be seen that the machine tool for forming or shaping an exterior three-sided non-circular profile on a workpiece 5 comprises a bed 1 on which a carriage 6 is arranged for displacement, by means of suitable driving elements (not shown), in a direction parallel to the axis 26 of said workpiece 5, i.e. in the direction of the double-headed arrow 38.

Mounted on the carriage 6 is a transverse slide 7 which is disposed in suitable slideways on said carriage 6 for displacement along said slideways by means of a hand crank or wheel 9 in a direction perpendicular to the axis of the workpiece and coinciding with the double-headed arrow 39. The slide 7 serves to regulate or determine the diameter of the workpiece.

The lower part 27 of a cross or compound slide 8 (Fig. 6) is provided with a circular scale 25 and is mounted on the transverse slide 7 for pivoting through an angle of 360°, means being provided for locking the cross slide in position on the transverse slide. The cross slide 8, which is provided with a further circular scale 24, may be displaced along said lower part 27 by means of a hand crank or hand wheel 10 and in the direction of the double-headed arrow 40.

A housing 11 for a crank mechanism is rotatably mounted on the slide 8 and may be clamped thereon in any desired position relative to the latter by suitable means (not shown). Two crankshafts or eccentric shafts 12 are supported in the housing 11 by means of bearings 13 and carry a pair of eccentrics or crank elements 41 on which a tool carrier 16 provided with a tool holder 17 and a turning tool 18 is guided.

The eccentrices 41 mounted on the shafts 12 are only schematically illustrated in Figs. 5 to 7. In lieu of the illustrated crank means it is possible to employ continuously adjustable circular eccentrics according to U.S. Patent No. 2,597,167, since in the shaping or working of non-circular profiles with different dimensions it is necessary to make use of crank means of various eccentricities.

The shafts 12, which must, of course, rotate in synchronism with one another, carry gear wheels 14 which mesh with an intermediately located gear 15 supported in the housing 11, as may be seen more particularly from Figs. 5 and 7.

The headstock 2 of the machine tool is provided with a driving spindle 23 carrying a chuck 4 arranged to hold one end of the workpiece 5, the other end of the workpiece being held by a spindle 3 of an adjustable tailstock (not shown). A sprocket wheel 20 is fixed to the spindle 23 and is connected via sprocket chain 21 to a further sprocket wheel 22.

The wheel 22 is connected to and drives a flexible shaft 19 which is coupled with one of the eccentric or crankshafts 12. The transmission ratio of the two sprocket wheels 20 and 22 is predetermined in accordance with the intended shape or form of the non-circular profile and is such that the rotational speed of each crankshaft 12 is always an integral multiple of the rotational speed of the spindle 23 and thus of the workpiece.

The operation of the embodiment of the invention illustrated in Figs. 5 to 7 is as follows, reference being also had to Figs. 1 to 4:

Assuming that the workpiece 5 is to have imparted thereto a three-sided or substantially triangular, manifold symmetrical, non-circular profile, the transmission ratio between the sprocket wheels 20 and 22 is so chosen that the ratio of the rotational speed of the workpiece to the rotational speed of the eccentric or crankshafts is 1:3. In the case of an elliptic profile, this ratio would, for example, be 1:2.

According to the invention, the tool 18 executes a circular motion determined by the cranks or eccentrics 41. However, since the shaping of the desired workpiece profile requires that the path of movement of the tool, when viewed in the direction of the rotational axis of the workpiece 5, be an ellipse 44 (Fig. 1), the plane of said circular motion must be oriented obliquely to the axis 26 (Fig. 5).

The eccentricity of each of the crank elements 41 employed to effect the circular motion of the tool 18 is calculated by means of the equation $$e = \frac{D_I - D_{II}}{4}$$

in which $D_I$ is the diameter of a circle circumscribed about the desired non-circular profile, while $D_{II}$ is the diameter of a circle inscribed in said profile.

As is evident from Fig. 1, the major and vertically oriented axis of the ellipse 44 has a length equal to $2e$ and determines the correct location of the point or tip of the tool 18 on a normal to the curve of the profile. The minor and horizontally extending axis of the ellipse 44 has a length equal to $2e(\sin \phi)$ which corresponds to the difference between the diameters of the inscribed and circumscribed circles.

Of Figs. 1 to 4 which illustrate a cycle of operation of the machine tool, Fig. 1 shows the tool 18 and the workpiece 5 in a position which may be considered as either their starting or their end position during shaping of the peripheral surface of the workpiece. The point of the tool is at this stage of the operational cycle located on the circumference of the inscribed circle (diameter $D_{II}$) and at the same level as the axis of rotation 26 of the workpiece.

Fig. 2 illustrates the position of the tool at an intermediate stage of the machining cycle, the point of the tool being now located a distance $e$ above the axis 26 and in engagement with a different portion of the workpiece surface.

In Fig. 3, the point of the tool is shown at a somewhat advanced stage of the cycle and on the circumference of the circumscribed circle (diameter $D_I$), the tool being in engagement with the workpiece surface at the same level as the axis 26.

In Fig. 4, the point of the tool is shown in a still more advanced intermediate stage of the shaping or machining operation, its engagement with the surface of the workpiece being effected at a distance $e$ below the axis 26.

The angle $\phi$, as may be seen from Fig. 5, is that angle included between the axis of one of the crankshafts 12 and the normal to the workpiece axis 26. This angle may be calculated from the equation $\sin \phi = 1/n$ or its equivalent $\phi = \sin^{-1}(1/n)$ where $n$ is the number of sides or corners of the profile to be formed on the workpiece. Thus, if the profile of the workpiece has three sides, $n = 3$ and the angle is 19° 30′.

The shaping of the workpiece can be started once the eccentricity of the crank means, i.e., of the eccentrics 41, has been properly selected and adjusted and after the angle $\phi$ between the shaft 12 and the perpendicular or normal to the workpiece axis has been fixed by means of the scale 24. A plain traverse of the tool 18 effected by means of the carriage 6 as the same moves along the machine bed 1 in conjunction with the circular movement of the tool results in imparting to the workpiece a cylindrical shape having a substantially triangular, equilateral cross-section. During such plain traverse of the tool, the oblique orientation of the cross slide 8 at an angle $\beta$ to the workpiece axis (or to a line parallel to said axis) is, of course, of no moment.

If it is desired to form a conical non-circular profile of the above type on the workpiece, oscillatory motion of the tool 18 is combined with a traverse effected through manual displacement of the cross slide 8 by means of the hand wheel or hand crank 10 while the carriage 6 remains stationary. The hand wheel 10 could, of course, be replaced by automatically operating means. During such a traverse, the slide 8 is oriented at the angle $\beta$ to the workpiece axis 26, which angle may be read off on the scale 25.

Figure 8:
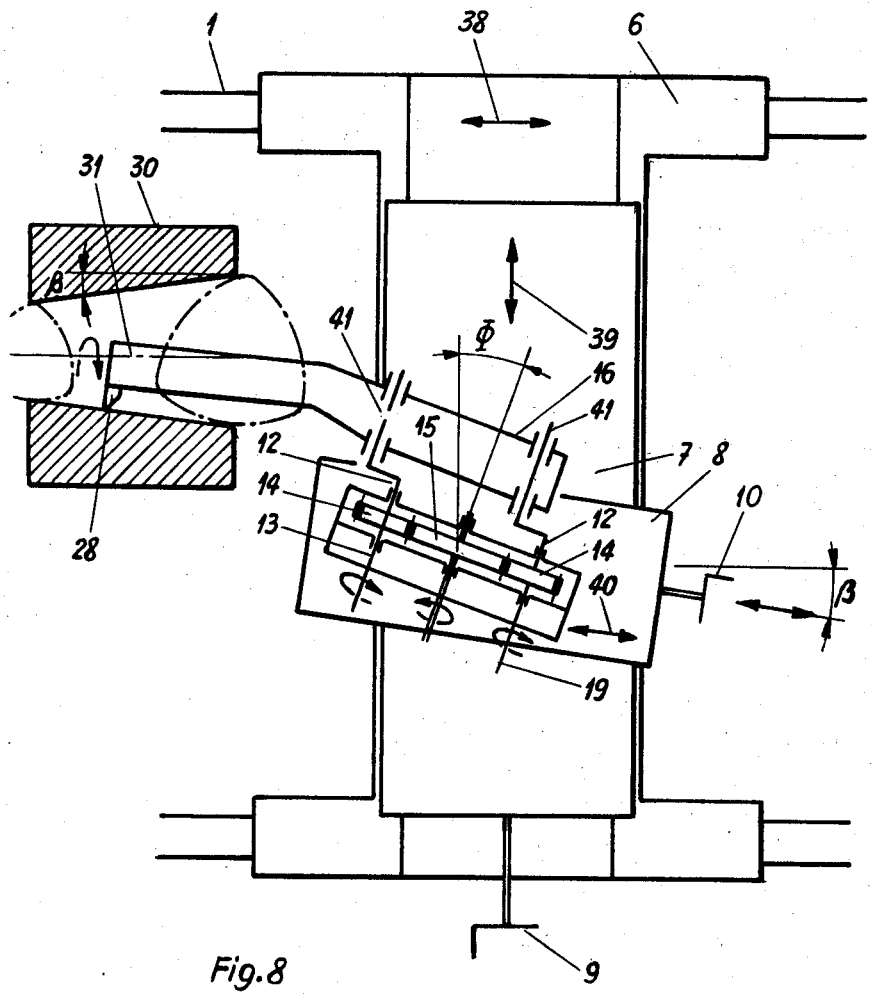
Fig. 8 is a schematic illustration of a modified embodiment of said apparatus which is especially adapted for shaping a conical equilateral triangular interior profile.

Referring now to Fig. 8, the machine tool there shown is designed to shape a three-sided or triangular profile in an interior conical bore of a workpiece 30 which is supported and rotated by means not shown in the drawing. In lieu of the tool holder 17 and tool 18 shown in Figs. 5 and 6 for the purpose of shaping the exterior surface of the workpiece 5, the machine tool according to Fig. 8 makes use of an elongated tool holder 31 carrying a suitable turning tool 28 and specially adapted for machining the surface of the workpiece bore.

The angles $\phi$ and $\beta$ shown in Fig. 8 are identical with the angles $\phi$ and $\beta$, respectively, referred to in connection with the embodiment of Figs. 5 to 7, the angle $\beta$ being equal to one half the cone angle of the interior profile to be formed. The eccentricity $e$ of the cranks 41 may be adjusted in any known manner.

Figure 9:
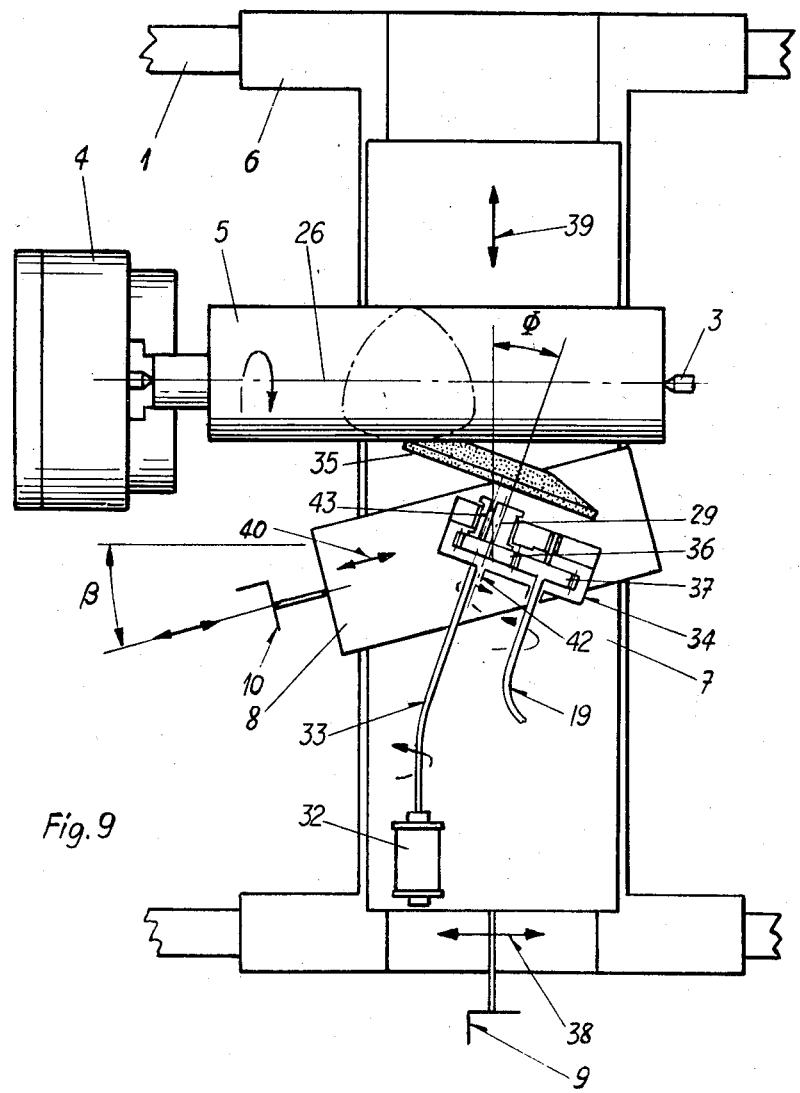
Fig. 9 is a schematic plan view of a further embodiment of the apparatus according to the present invention constructed for grinding an exterior triangular equilateral profile.

A further embodiment of the invention is illustrated in Fig. 9, in accordance with which the shaping of the manifold symmetrical, non-circular profile of a rotating workpiece is effected by means of a grinding wheel 35 or, if desired, by means of a milling tool (not shown).

In contradistinction to the embodiments of Fig. 5 and 8, where the circular motion of the turning tool 18 or 28 in a plane parallel to itself was effected through the intermediary of two laterally spaced and synchronously rotated crankshafts 12 provided with eccentrics or cranks 41, the driving means of the apparatus according to Fig. 9 is much more simplified.

A housing 34 for the crank means is rotatably mounted on the cross slide 8 and arranged to be clamped in any desired position on said cross slide. The housing 34 carries a crankshaft 29 in bearings 42, the shaft being provided with an eccentric or crank 43.

A gear wheel 36 is mounted on the crankshaft 29 and meshes with a gear wheel 37 rotated by means of a flexible shaft 19 driven by the working spindle 23. The driving connection between said spindle and the flexible shaft 19 is not shown in Fig. 9, but it is substantially identical with the connection shown in the embodiment of Fig. 5.

The shaping or working tool, which is constituted by a grinding wheel 35, is supported by the eccentric 43 and is driven by means of a motor 32 through the intermediary of a flexible shaft 33 which is connected to the axis of the eccentric. As indicated hereinabove, a milling cutter or like tool could be employed in lieu of the grinding wheel 35.

As in the embodiment of Fig. 5, for example, the workpiece 5 is supported at its opposite ends by means of a chuck 4 and a tailstock spindle 3, the cross slide 8 being mounted on a transverse slide 7 carried by a carriage 6.

Where the workpiece 5 is to be cylindrical, as shown in Fig. 9, the tool 35 is traversed along the workpiece, parallel to the axis thereof and in the direction of the double-headed arrow 38 by means of the carriage 6. On the other hand, where a conical workpiece is involved, the tool must be traversed in the direction of the double-headed arrow 40 by means of the cross slide 8 which is oriented at an angle $\beta$ to the axis of the workpiece.

In all of the embodiments of the invention disclosed herein, the workpiece is rotated at a constant or uniform, but adjustable, rotational speed by means of any suitable motor employed with or without the aid of an appropriate, infinitely variable transmission as found in most conventional lathes or like machine tools.

The above described procedures facilitate the use of considerably less complicated machine elements than has heretofore been necessary in implementing known procedures. Moreover, the number of such machine elements is substantially reduced, which has a favorable effect on the precision of the work being performed.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. The process of forming, by means of a working tool, a manifold symmetrical, non-circular profile on a workpiece supported for rotation about an axis, comprising the steps of rotating said workpiece at a constant speed and imparting to said tool a bodily movement along a circular path towards and away from said axis and at a speed depending on the speed of said workpiece, the plane of said movement defined by said circular path being oriented obliquely with respect to said axis.

2. The process according to claim 1, said speed of said bodily movement of said tool along said circular path being an integral multiple of said speed of rotation of said workpiece.

3. In an apparatus for imparting a manifold symmetrical, non-circular profile to a workpiece and equipped with means for rotating said workpiece about an axis and with working tool means engageable with said workpiece; slide means arranged for displacement in a first plane parallel to said axis of rotation of said workpiece, and crank means arranged on said slide means and operatively connected to said tool means for imparting to the latter a bodily movement towards and away from said axis in a circular path in a second plane oriented obliquely with respect to said axis, said crank means including at least one crankshaft oriented at a predetermined angle less than 90° to said axis.

4. In an apparatus according to claim 3; including transmission means operatively interconnecting said crankshaft and said workpiece rotating means, whereby the speed of said bodily movement in a circular path of said tool means is directly correlated to the speed of rotation of said workpiece.

5. In an apparatus according to claim 3; said crank means including at least one additional crankshaft and comprising two eccentrics mounted, respectively, on said crankshafts, and means operatively interconnecting said crankshafts to ensure rotation thereof in synchronism with one another, said tool means including a tool carrier guided on said eccentrics.

6. In an apparatus according to claim 3; said crankshaft being provided with one eccentric, said tool means comprising a tool rotatably supported by said eccentric, and motor means operatively connected to said tool for rotating the latter during said bodily movement in a circular path thereof in said second plane.

7. In a machine tool for imparting a manifold symmetrical, non-circular profile to a workpiece and equipped with means for rotating said workpiece at a constant speed about an axis and with working tool means engageable with said workpiece for machining the latter; slide means arranged for displacement in a first plane parallel to a horizontal plane passing through said axis of rotation of said workpiece, and crank means carried by said slide means and operatively connected to said tool means for imparting thereto a bodily movement towards and away from said axis in a circular path in a second plane obliquely with respect to said axis, said crank means including at least one rotatable crankshaft oriented at a predetermined angle to a normal to said axis.

8. In a machine tool according to claim 7; means mounting said crank means for angular adjustment on and relative to said slide means, whereby said angle between said crankshaft and said normal to said axis may be varied.

9. The process of forming, by means of a working tool, a manifold symmetrical, non-circular profile on a workpiece supported for rotation about an axis, comprising the steps of rotating said workpiece at a constant speed, traversing said tool linearly along said workpiece and in engagement with the surface thereof, and imparting to said tool during said traverse thereof and while in engagement with said rotating workpiece a bodily movement towards and away from said axis in a circular path at a speed determined in accordance with the characteristics of the desired profile of said workpiece and depending on said speed of rotation of said workpiece, the plane of said bodily movement in a circular path being oriented obliquely with respect to said axis.

10. The process according to claim 9; wherein said tool is traversed along said workpiece in a direction parallel to said axis.

11. The process according to claim 9, wherein said tool is traversed along said workpiece in a direction oriented at a predetermined oblique angle less than 90° with respect to said axis.

References Cited in the file of this patent

UNITED STATES PATENTS

| | | |
|---|---|---|
| 1,698,538 | Deutsch | Jan. 8, 1929 |
| 2,263,788 | Schroder | Nov. 25, 1941 |
| 2,597,167 | Musyl | May 20, 1952 |

FOREIGN PATENTS

| | | |
|---|---|---|
| 162,651 | Austria | Mar. 25, 1949 |
| 162,654 | Austria | Mar. 25, 1949 |
| 645,829 | Great Britain | Nov. 8, 1950 |
| 688,031 | Germany | Feb. 10, 1940 |